US011036785B2

(12) United States Patent
Gupta et al.

(10) Patent No.: US 11,036,785 B2
(45) Date of Patent: Jun. 15, 2021

(54) BATCH SEARCH SYSTEM FOR PROVIDING BATCH SEARCH INTERFACES

(71) Applicant: eBay Inc., San Jose, CA (US)

(72) Inventors: Neeraj Gupta, Milpitas, CA (US); Madhuri Aggarwal, Milpitas, CA (US); Yogesh Dalal, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 100 days.

(21) Appl. No.: 16/292,733

(22) Filed: Mar. 5, 2019

(65) Prior Publication Data

US 2020/0285667 A1 Sep. 10, 2020

(51) Int. Cl.
*G06F 3/048* (2013.01)
*G06F 16/532* (2019.01)
(Continued)

(52) U.S. Cl.
CPC .......... *G06F 16/532* (2019.01); *G06F 3/0482* (2013.01); *G06F 16/538* (2019.01);
(Continued)

(58) Field of Classification Search
CPC ............... G06F 16/532; G06F 16/5866; G06F 16/9535; G06F 16/583; G06F 16/242; G06F 16/5846; G06F 16/951; G06F 16/248; G06F 16/338; G06F 16/3328; G06F 16/954; G06F 3/04842
See application file for complete search history.

(56) References Cited

U.S. PATENT DOCUMENTS 8,595,773 B1 11/2013 Wang et al.
8,712,862 B2 4/2014 Gokturk et al.
(Continued)

FOREIGN PATENT DOCUMENTS

WO 2020/180457 A1 9/2020

OTHER PUBLICATIONS

Liu et al., "Content-Based Tag Processing for Internet Social Images", Multimed Tools and Applications, 2011, pp. 723-738.
(Continued)

*Primary Examiner* — Linh K Pham
(74) *Attorney, Agent, or Firm* — Shook, Hardy & Bacon L.L.P.

(57) ABSTRACT

Various methods and systems for providing batch search interfaces that support operations for dynamically generating batch search queries, executing batch search queries, and causing display of batch search query result items are provided. In operation, a batch search query interface for inputting images is generated. An image is received. A first feature and a second feature of the image are detected from the image. A first tag for the first feature and a second tag for the second feature are displayed on the batch search query interface. The tags refer to attributes associated with different features of the image. A batch search query based on the first and second tag is communicated to cause execution of the batch search query to generate search results. A first and second plurality of results associated with the respective tags are simultaneously displayed using feature-tag-specific results display portions of the batch search results interface.

20 Claims, 11 Drawing Sheets

(51) Int. Cl.
*G06F 16/538* (2019.01)
*G06F 16/953* (2019.01)
*G06F 3/0482* (2013.01)
*G06K 9/00* (2006.01)
*G06K 9/62* (2006.01)

(52) U.S. Cl.
CPC ....... *G06F 16/953* (2019.01); *G06K 9/00671* (2013.01); *G06K 9/6253* (2013.01); *G06K 9/00744* (2013.01); *G06K 2209/27* (2013.01)

(56) References Cited

U.S. PATENT DOCUMENTS

| | | | |
|---|---|---|---|
| 9,195,898 B2 | 11/2015 | Huang et al. | |
| 9,298,712 B2 | 3/2016 | Velagapudi et al. | |
| 9,875,258 B1* | 1/2018 | Hsiao | G06F 16/5846 |
| 10,346,727 B2* | 7/2019 | Lin | G06K 9/66 |
| 2010/0153831 A1 | 6/2010 | Beaton | |
| 2011/0137895 A1* | 6/2011 | Petrou | G06F 16/29 |
| | | | 707/723 |
| 2011/0219291 A1* | 9/2011 | Lisa | G06F 40/166 |
| | | | 715/207 |
| 2012/0109993 A1* | 5/2012 | Reznik | G06F 16/583 |
| | | | 707/765 |
| 2013/0129142 A1* | 5/2013 | Miranda-Steiner | |
| | | | G06K 9/00664 |
| | | | 382/103 |
| 2013/0132236 A1* | 5/2013 | Gokturk | G06F 16/5838 |
| | | | 705/26.61 |
| 2013/0144727 A1 | 6/2013 | Morot-Gaudry et al. | |
| 2017/0193011 A1 | 7/2017 | Kale et al. | |
| 2018/0121768 A1* | 5/2018 | Lin | G06K 9/4628 |
| 2018/0181592 A1* | 6/2018 | Chen | G06F 16/5838 |
| 2020/0142932 A1* | 5/2020 | Hazra | G06F 16/90324 |

OTHER PUBLICATIONS

Yeh et al., "A Picture is Worth a Thousand Keywords: Image-Based Object Search on a Mobile Platform", 2005, pp. 2025-2028.
International Search Report received for PCT Application No. PCT/US2020/017296, dated May 12, 2020, 6 pages.
International Written Opinion received for PCT Application No. PCT/US2020/017296, dated May 12, 2020, 10 pages.
Käki et al., "Findex: improving search result use through automatic filtering categories", Interacting with Computers, vol. 17, No. 2, Mar. 2005, pp. 187-206.

* cited by examiner

BATCH SEARCH SYSTEM FOR PROVIDING BATCH SEARCH INTERFACES

BACKGROUND

Users often rely on search systems to help find information stored on computer systems. Such search systems support identifying, for a single received search query, a single search query result from one or more storage mediums having storage data structures or encoded data (e.g., item databases and files). For example, a search query, having one or more keywords, can be executed using a search system to find relevant search result items based on the one or more keywords of the search query. With the ever-increasing use of search systems for retrieving electronically stored information, improvements in computing operations for search systems can provide more efficient processing of search queries and efficiency in user navigation of graphical user interfaces in search systems.

SUMMARY

Embodiments of the present invention relate to methods, systems and computer storage media for providing a batch search system having batch search interfaces that support operations for dynamically generating batch search queries, executing batch search queries, and causing display of batch search query result items. By way of background, performing keyword searches can be challenging for users because conventional search systems primarily support executing search queries for a single search query (e.g., keyword or phrases) and lack graphical user interfaces that support batch searching for multiple search queries. For example, in order for a user to perform a search for two or more items, such as a "computer keyboard" and a "water bottle," the user would have to enter each search query independently to cause a search system to execute an independent search for each search query. Search query results items for each search query are also independently retrieved and independently caused to be displayed. Moreover, current search system graphical user interfaces do not support combined visual defining of individual search queries or combinations of search queries simultaneously, such that the user may provide, through a single batch search query graphical user interface, refinements for multiple search queries at the same time. As such, an alternative approach for providing search query functionality in search systems would improve computing operations and user interface navigation in search systems.

Embodiments described in the present disclosure are directed towards improving search systems based on providing a batch search system having batch search interfaces (e.g., batch search query interface and batch search results interface) that support operations for dynamically generating batch search queries, executing batch search queries, and causing display of batch search query result items. In particular, the user may provide a media input (e.g., a media resource) as an input to a batch search interface. The batch search system provides batch search query interfaces for dynamically generating multiple batch search queries simultaneously. Dynamically generating a batch search query includes recognizing and tagging features identified in media input, and continuous and adaptive alteration of the individual search queries based on user selections through the batch search query interface such that each of a plurality search queries in the batch search query is caused to be executed substantially in parallel as the batch search query.

The batch search system also provides batch search result interfaces that include a simultaneous display of search result items for the search queries defined using the input image. The batch search system executes the batch search query such that corresponding search result items are identified and caused to be displayed in feature-tag-specific results display portions of the batch search results interface. For example, the batch search results interface includes a first feature-tag-specific results display portion with search result items for the first feature and a second feature-tag-specific results display portion with search result items for the second feature. In this regard, search result items for a media input are a combined set of simultaneously displayed search result items for search queries in a batch search query, where each of the search queries was simultaneously defined using the batch search interface.

In operation, a batch search query interface for inputting input images is generated. The batch search query interface includes a plurality of graphical control elements for dynamically generating batch search queries. An input image is received. The input image is associated with a plurality of features. A first feature and a second feature of the input image are detected as batch search query features. A first tag for the first feature and a second tag for the second feature are displayed on the batch search query interface, where tags are attributes associated with features of the input image. A batch search query is communicated based on the first tag and the second tag.

A first plurality of results associated with the first tag and a second plurality of results associated with the second tag are received. The first plurality of results and the second plurality of results are simultaneously displayed on a batch search results interface, with the first plurality of results and the second plurality of results displayed on feature-tag-specific results display portions of the batch search results interface. In embodiments, complementary results for the search queries in the batch search query are identified, and replacement results for a damaged feature are also identified such that the batch search results interface include a feature-tag-specific complementary results portion for displaying complementary results based on corresponding feature-tags and a feature-tag-specific replacements display portions for displaying replacement results based on corresponding damaged feature-tags.

As such, the embodiments described herein provide computing operations for dynamically generating batch search queries, executing batch search queries, and causing display of batch search query result items, which improves on conventional operations that only support performing two or more independent search queries. Advantageously, the batch search query interfaces and the batch search results interfaces improve efficiency in user navigation of graphical user interfaces in search systems.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
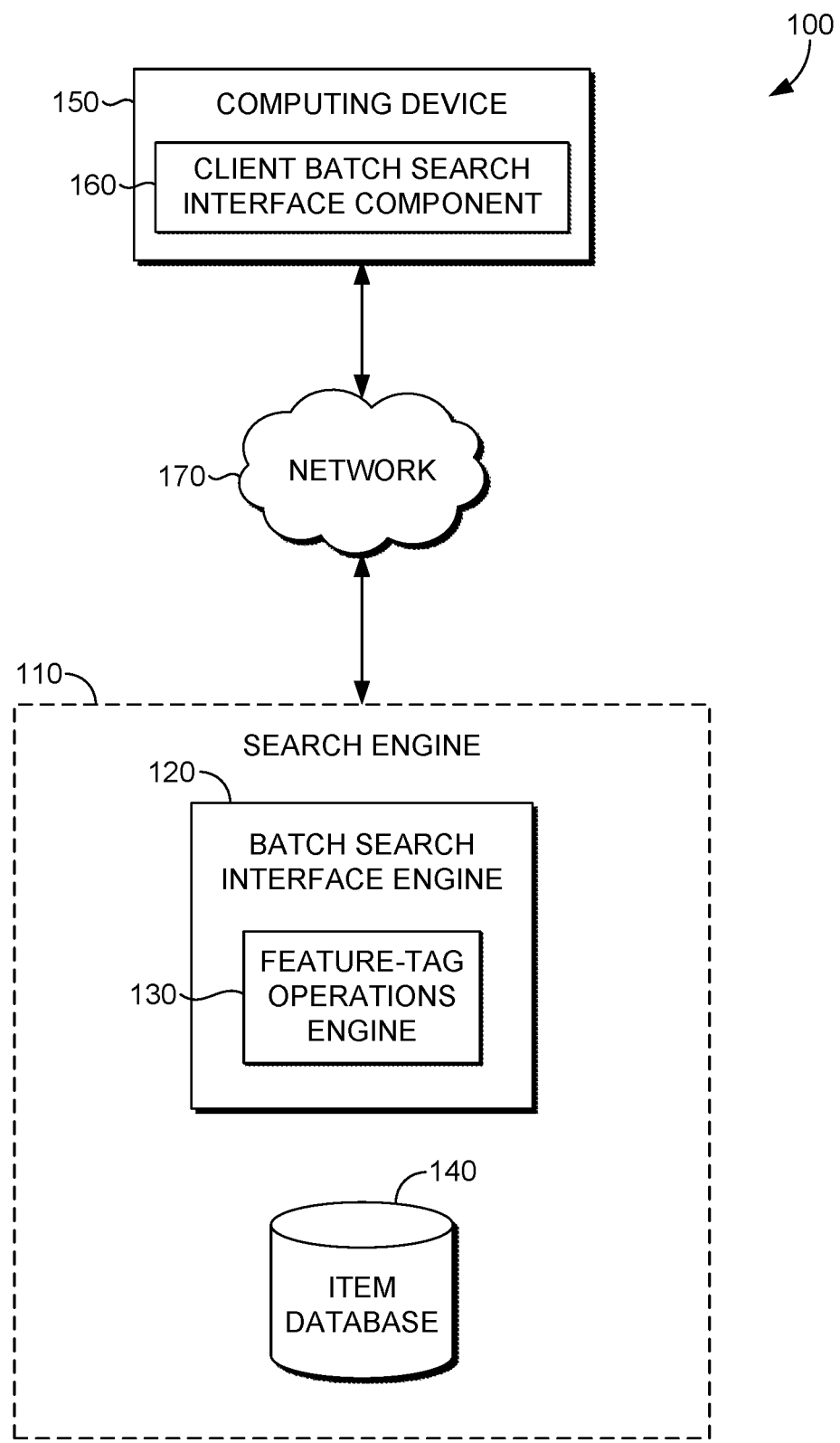
FIG. 1 is a block diagram of an exemplary batch search system, in which embodiments described herein may be employed.

Search systems support identifying, for received queries, query result items (e.g., products or content) from item databases. Item databases can specifically be for content platforms or product listing platforms such as EBAY item listing platform, developed by EBAY INC., of San Jose, Calif. Search systems include search system functionality that is implemented to systematically browse databases, the World Wide Web, etc., for the purpose of identifying documents and/or items relevant to the search query. For example, a typical search query with multiple words will default to find results most relevant to all of the keywords submitted to the query.

In conventional search systems, a search query is implemented such that a search query for two or more keywords is performed as a single search for all of the keywords. For example, a search for "tent" and "cooler" may return results that are relevant to both terms and/or either term. Results for the single search query are displayed in a single listing of results. That is, if a user searches "tent OR cooler," the search results may comprise a combination of exclusive "tent" results and exclusive "cooler" results; however the results will be intermingled in a single list of query results. Further, typical search queries are performed using text-based user inputs; while other search queries may transcribe audio into text.

Users desiring to search items from a multimedia object (i.e., media resource such as an image or a video) also face challenges in existing GUIs of search systems. Users may be forced to manually identify items in the image and generate their own queries. Relying on users to identify features and create search queries, with the necessary particularity to generate desirable search results, incorporates inefficiencies from the users' perspective, and is likely to consume otherwise-unnecessary computing resources in order to perform multiple searches until the desired search results are presented. As such, an alternative approach for providing search query searching functionality in search systems would improve computing operations and user interface navigation in search systems.

Embodiments of the present invention relate to methods, systems and computer storage media for improving search systems based on providing batch search systems having batch search system interfaces (e.g., batch search query interface and batch search results interface) that support operations for dynamically generating batch search queries, executing batch search queries, and causing display of batch search query result items (e.g., search query results, complementary results, and replacement results). At a high level, the user may provide a media input or media resource as an input to a batch search interface. The media resource may be an image or a video. The batch search system provides a batch search query interface (e.g., client interface) that includes graphical control elements that are used for dynamically generating batch search queries. The client interface specifically supports operations that detect one or more features from the media input. Detecting the one or more features can be performed using local operations, remote operations, or a combination thereof. For example, local operations contemplate that the detection mechanism is primarily at a client device, remote operations contemplate the detection mechanism is primarily at a server device.

The client interface also supports identification of a tag for each of the features. A tag may refer to an attribute associated with a feature of the media resource. For example, the user may upload an image of a group of people playing football. The client interface may automatically detect features, such as jerseys, helmets, and shoes, being worn on the body of a player; a referee jersey, and whistle being worn on the body of a referee; and a football. Features and tags can be detected based on classifiers using an item database taxonomy that identifies a plurality of categories (e.g., a category tree). The hierarchical framework (e.g., categories and subcategories) of the items database taxonomy are used for both feature recognition and tagging and corresponding hierarchy of the features to tags. It is contemplated that features of the media resource are associated with specific characteristics of the media resource (e.g., image or video). For example, image-type features or characteristics are identified for images and video-type features or characteristics are identified for video. Detecting the features may also be associated with a granularity setting that defines how broadly or narrowly features are detected. Features can also be determined as damaged such that the feature is tagged and processed accordingly, in accordance with embodiments described herein.

The client interface may also support detection of metadata associated with the media resource. For example, it is further contemplated that the client may further detect or deduce a search context associated with the input media resource, which is used to provide more relevant search result items. The search context may be explicitly tagged or implicitly tagged to a corresponding feature, where the context is used in executing a corresponding search query or the generated batch search query. For example, the image of football players may not show the pads worn beneath the players' jerseys. However, by detecting the football, the referee, and a group of players, the batch search system may detect that the scene is related to playing football (i.e., context). As such, search result items associated with football pads may be determined to be relevant (e.g., recommended search result items). In this regard, both visual (e.g., motion between video frames, a setting of an image, etc.) and non-visual (e.g., audio associated with a video) features of the media resource can be detected and provided on the batch search interface as tags.

The batch search system provides batch search query interfaces for dynamically generating multiple batch search queries simultaneously. Dynamically generating a batch search query includes continuous and adaptive alteration of the individual search queries based on user selections. For example, a batch search interface includes graphical control elements that allow users to add, remove, combine, or modify any features or tags generated on the batch search interface. The graphical control elements of the batch search query interface may be used to receive user selections that trigger dynamic and visual alterations of the features of a media input. Using the previous example, the automatic generation of tags may not detect a mouth guard due to the quality or angle of the image; however, the batch search system allows the user to add the mouth guard to the batch search input. In this regard, the user has the ability to control the generation of different search queries for the media input, which is part of simultaneously and visually defining multiple search queries into a batch search query that can be executed together on the batch search system. User selections are received through the batch search query interface such that each of a plurality search queries in the batch search query is caused to be executed. The search queries in the batch search query may be executed substantially in parallel.

The batch search system provides batch search results interfaces that include a simultaneous display of search result items for the search queries defined using the input image. The batch search system executes the batch search query such that corresponding search result items are displayed in feature-tag-specific results display portions of the batch search results interface. For example, the batch search results interface includes a first feature-tag-specific results display portion with search result items for the first feature and a second feature-tag-specific results display portion with search result items for the second feature. In this regard, search result items for a media input are a combined set of simultaneously displayed search result items for search queries that are simultaneously defined using the batch search interfaces. Other variations and combination of batch search interfaces for search result items are contemplated with embodiments described herein.

In operation, a batch search query interface is provided for accessing the input image (or media resource) and a batch search result interface is provided for simultaneously displaying grouped search result items for the input image. The batch search query interface supports defining batch search queries based on features and tags associated with the input image. The batch search result interface supports displaying, filtering, and sorting the simultaneously displayed feature-tag-specific grouping of search result items generated based on the features and tags. For example, filtering can be based the particular images or videos a user in interested in, to continue performing searching, where, in a search results pages, the user can filter the combination of images and video clips to retain or remove different selections. In a conventional system, in order to return results for a football jersey and a referee whistle, a user would be forced to perform two independent search queries, each independent search query having independent search results. Using batch search system, these items, and others, may be simultaneously searched in the single batch search query and results for the batch search query simultaneously displayed on the batch search result interface.

Embodiments of the present invention are further described below with reference to example operations and techniques which are not meant to be limiting. In operation, a batch search system may implement several engines, managers, devices, interfaces (collectively "components") to perform operations associated with providing batch search interfaces. The batch search system may provide a plurality of graphical control elements for dynamically generating batch search queries. The batch search interfaces can include various input options to allow for creating a batch search query. By way of example, a text bar may be provided that would allow a user to manually enter a plurality of queries.

The batch search interface may provide a client interface tool (e.g., multimedia input tool) that allows a user to provide a media resource to the batch search system. The media resource could be any one or more images, or video. For example, the batch search system may provide an ability to upload a digital photo stored on the user device used to access the batch search system and use the entire photo or provide the user the ability to crop the photo to focus on one or more desired portions. With respect to the input, the batch search system may permit the upload of a media resource stored locally on the user device; or may obtain the resource from an internet resource upon the input of a URL, or web address; or may provide users the ability to use a camera of the user device to capture a new media resource. The batch search system may also provide a video-specific search interface. The video-specific search interface may provide video snipping functions wherein an input video can be clipped into to one or more clips and one or more individual frames may be individually selected. Additionally, the video-specific search interface may provide functionality where a search may be performed on a portion of a streaming video, that is, once a first portion is streamed, a first search may be performed as described herein, yielding first search results. Once a second portion is streamed, a second search may be performed, yielding second search results, which may be used to reconcile or update the first search results.

With reference to detection operations (or feature recognition and tagging) the batch search system identifies and tags features (e.g., objects in the media resource or metadata associated with the media resource) within the image using any object detection techniques. Object detection generally refers to computer technology related to computer vision and image processing that deals with detecting instances of semantic objects of a certain class (such as humans, buildings, or cars) in digital images and videos. Object detection further includes tagging objects with features with determined attributes. By way of example, an object and feature in an image may be identified as a child playing with a toy; tags or attributes such as the age and gender of the child may be determined (e.g., female aged 2-4 years old), and those attributes may be used to determine one or more item keywords (e.g., "toy AND toddler AND girl"). Once the feature and tags are identified, the features and tags may be provided on a user interface in proximity to the identified feature.

With continued reference to object detection techniques, features may be detected within the media resource using any suitable means for boundary or edge detection. The batch search system may utilize color detection to identify the boundary between two features, and may use color detection in order to provide a clue for identifying the feature, or may utilize the detected color as the basis for determining an attribute of the feature. For example, the batch search system may use color detection to determine that a feature having a first color is a different color than its surroundings, this information may be used to isolate the feature and support its detection or identification. The batch search system may use material detection to detect the boundaries or edges between different apparent textures and materials. Like color detection, material detection may be used to support detecting or identifying the feature or may utilize the detected material as the basis for determining an attribute of the feature. Other variations and combinations of detection techniques are contemplated with embodiments of the present invention.

Once the feature has been detected, the batch search system utilizes one or more classifiers in order to determine an attribute of the feature or to identify an item that is representative of one or more attributes of the feature. In some embodiments, the detected features may use any suitable image search functionality as an image classifier. The batch search system may use optical character recognition (OCR) to determine text on a feature and utilize said text to provide an attribute of the feature or an item associated with such an attribute. For example, a feature may be identified as a purse, using an image search functionality, and the OCR operation to determine that the feature has the text "Coach" included thereon. Using the OCR and image search classifiers, the batch search system may determine that the feature is a COACH™ purse. Any one or more of the classifiers may be used to determine an attribute of the feature, an item associated with an attribute, and a category of the feature, among others. For example, an image classifier may determine that a feature is associated with the "purse" category of items.

In embodiments providing for the media resource being a video input, a motion classifier may be provided by the batch search system in order to classify movements of the feature. For example, a video of a man sitting in a recliner may be provided to the batch search system. Without the motion classifier, the batch search system may detect the chair and classify it based on its motionless characteristics; that is, the batch search system may identify the chair as an accent chair or a leather chair, for example. Using the motion classifier, search system may identify the motion of the reclining and classify said motion to determine a new attribute, in this case, that the chair is a recliner.

Having used any one or more of the classifiers, any one or more of the determined attributes or items associated with an attribute may be displayed as one or more tags on a user interface of the user device in proximity to the detected feature. The batch search system provides a user interface for viewing, selecting, and modifying the tags. For any particular feature, a tag may comprise any combination of attributes or items associated with one or more attributes. Returning to the example of the recliner, a first tag may be generated for the person sitting in the recliner and a second tag may be generated for the recliner itself. The first tag may be labeled initially as "Man" and selectively expanded to reveal attributes or items associated with "Man."

By way of example, when expanded, "Man" may include attributes such as the man's age, articles of clothes being worn by the man (e.g., a red shirt, blue jeans, and black sneakers), or items in close proximity to the man (e.g., eyeglasses being worn, a pen being held, etc.). The second tag may be labeled initially as "chair" and selectively expanded to reveal attributes or items associated with "Chair." For example, when expanded, "Chair" may include attributes such as recliner (based on the motion classifier), a material (e.g., leather, fabric), or a color. The batch search system may provide a user interacting with the user interface of the mobile device the ability to select the high-level tag, such as "Man" or "Chair," or select any one or more of the attributes or items associated with the one or more tags, such as "Man|red shirt" or "Chair|recliner." In some aspects, either the high level tags or the granular attributes or items may be modified by the user if the user determines that the classifier was incorrect or inaccurate in its classification. For example the user may have specific knowledge that the recliner is upholstered in imitation leather as opposed to genuine leather. The user may modify the "leather" attribute to become "imitation leather."

The batch search system also provides functionality for manually detecting and classifying features. While the feature detection function is designed to detect the relevant features within the media resource, a threshold must be set in order to avoid too many features from being detected and classified, which would provide noise and confusion to a user's interaction with the user interface. For example, a media resource may be an image of a family having a picnic at a campsite. The image may include a variety of relatively small flora features. Due to the small makeup of each individual small flora feature vis-à-vis the image as a whole, the feature detection process may focus more on relatively larger features such as a tent, people, a picnic blanket, or a cooler. Should the user desire to include an undetected feature, the batch search system may provide manual feature detection that permits a user to specify the feature (e.g., with a pointer, drop pin, or the like). In this way, the user may instruct the batch search system to attempt to specifically detect and classify a particular feature; in the case of the camping example, a relatively small feature such as a unique flower.

In one embodiment, the batch search system supports detection operations where features can also be determined as a damaged feature. Using the detection techniques described herein, a feature in a media input is determined as damage such that the feature is tagged and processed as a damaged feature. A feature that is damaged may refer to a feature having a degraded change to its original form, for example, a physical object that is degraded from its initial state. It can broadly be defined as changes introduced into a system that adversely affect its current or future performance. For example, an image may include a mobile device having a cracked screen. The mobile device screen may be identified as the feature and then a determination is made that the screen is cracked. As such, the detection operations further includes tagging the feature as damaged feature. For example, the detection operation provides a damaged feature-tag for the phone, where a tag for the phone includes an indication that the phone is damaged. As discussed below, feature-tag-specific replacements display portions for displaying replacement results based on corresponding damaged feature-tags can be provided.

With continued reference to operations that support dynamically generating a batch search query, user selections, received using graphical control elements, support generating the batch search query. Based on the user selection of the tags that the user desires to search, the batch search system will create a modifiable batch search query. The batch search system may provide an individual selection feature, where individually selected tags become individual search queries. The batch search system may also provide a combination selection feature, where multiple selected tags become a single search query. Returning to the example of the recliner, a user may individually select "chair|brown" or "chair|recliner." In response, the batch search system will create two independent queries, one for each tag. If selected in the combination selection mode, the batch search system will create a single unitary query of "chair|brown|recliner." In some embodiments the batch search system may display the selected search queries on the user interface of the mobile device prior to executing the search, allowing the user to modify or attend the to-be-executed search. For example, the user may add an attribute to a detected item, such as indicating that the chair is capable of swiveling, or the user may add free text of an attribute or item the user desires to specifically search, such as a table lamp.

After assembling the batch search query, the batch search system may perform the batch search upon execution by the user. The performance of the batch search may involve any web crawling or database crawling techniques suitable for identifying items based on the selected attributes or falling within the category of item selected by the user. During the performance of the batch search query, the batch search system may simultaneously or sequentially perform a search for each of the selected search queries. Again returning to the example of the recliner, if "chair|brown" and "chair|recliner" were selected in individual mode, a first search would be completed for the first query text (chair|brown) and a separate second search would be completed for the second query text (chair|recliner). If selected in combination mode, and appended with the query text "table lamp," a first search would be completed for the first query text (chair|brown|recliner) and a separate second search would be completed for the second query text (table lamp).

In this regard, the batch search query interface allows selection of the identified features and tags in order to create a batch query, where the batch search query refers to two or more search queries communicated for execution in parallel or substantially in parallel. The two or more search queries would other have been executed independently in conventional search systems. In response to the submission of the batch search query, search result items are displayed on a batch search result interface such that results for each query are grouped together, with two or more groups being simultaneously displayed.

The batch search system may also provide for the simultaneous display of batch search results, grouped by search query tags. On a single batch search results interface, search results will be displayed for the plurality of search queries tags, grouped by the query text. Returning to the example of the search having the search text of "chair|red" and "chair|recliner," the batch search result interface may comprise a first group of results for "chair|red" and a second group of results for "chair|recliner." The batch search system may utilize traditional Boolean searching in order to carry out the plurality of search queries, wherein text associated with an item listing is determined to match the search query text. The batch search system may additionally or alternatively utilize affinity-based searching, wherein search results are organized by co-occurrences or relationships (e.g., complementary or substitute) among individual item listings. Each group of search results may include sorting functions that enable user to sort by relevance, price, brand, availability, and the like.

Within each group of results, one or more items satisfying the respective search query will be displayed. In some embodiments, the batch search system provides that on the batch search result interface, these items within each group result are a preview of the item, the preview comprising any one or more of a preview representation (e.g., an image, GIF, video clip, or the like), and item name, or price. In other aspects, the batch search system may provide a user the ability to modify the contents of the preview representations. In embodiments where a media resource was used to originate the query text, the batch search system may provide a reproduction of the detected feature as part of the grouped search results in order for the user to visually correlate search results to the detected feature.

In addition to providing matching search results to the batch search query, the batch search system may provide complementary search results. The batch search system may utilize information about the query text to identify items that may relate to, but not match the query text. Using information available to the batch search system, such as the historical browsing and purchasing behavior of a specific user or of a group of users, location information (e.g., location of the user doing the searching, location associated with the media resource), or timing information (e.g., if the search is being conducted around Halloween, Halloween-related search results may be more relevant), the batch search system may determine that a first recommended item (or group of items) is frequently bought with a matching item of a particular category. For example returning to the uploaded image of the family camping, a first query text of "tent" may return matching results for tents. The batch search system may determine that sleeping bags are frequently purchased with or in proximity to the purchase of tents. Based on this relationship, the complementary search results may display a group of search results for sleeping bags. The batch search system may also utilize information about the query text to determine items that may be substitutes for the query text. Accordingly, the complementary search results may comprise a group for beach blankets or blankets, generally.

Embodiments of the present invention have been described with reference to several inventive features associated with a batch search system that supports providing batch search interfaces. Functionality of the embodiments of the present invention have further been described, by way of implementation and anecdotal examples, to demonstrate that the operations for processing batch search queries are an unconventional ordered combination of operations that operate to improve the user interaction with a computing device, improve the efficiency and use of computing resources in order to perform otherwise-independent search queries, and improve the functioning of user devices with limited display resources by specifying what information is displayed and how it is displayed. Further, embodiments of the present invention demonstrate a solution to a specific problem in search technology where an otherwise independent search queries requiring independent search resources and independent display resources may be consolidated into a single batch search system. Overall, these improvements result in less CPU computation, small memory requirements, and increased flexibility in search systems.

With reference to FIG. 1, FIG. 1 illustrates an exemplary batch search system 100 in which implementations of the present disclosure may be employed. In particular, FIG. 1 shows a high level architecture of that batch search system 100 having components in accordance with implementations of the present disclosure. Among other components, managers, or engines not shown, batch search system 100 includes a computing device 150, which may also be referred to herein as a client device, the computing device 150 having a client batch search interface component ("client interface" 160). The computing device 150 may communicate via a network 170 and with a search engine 110. The search engine 110 includes the batch search interface engine 120 having the feature-tag operations engine 130, and the item database 140. The components of the batch search system 100 may communicate with each other over one or more networks (e.g., public network or virtual private network "VPN") as shown with network 170. The network 170 may include, without limitation, one or more local area networks (LANs) and/or wide area networks (WANs). The computing device 170 may be a client computing device that corresponds to the computing device described herein with reference to FIG. 6. Each of the identified components may represent a plurality of different instances of the component. Further the batch search interface engine 120 may combine components, such as, feature detector, classifier, and a batch search engine (all not shown) that support the functionality described herein.

The components of the batch search system 100 may operate together to provide functionality for a batch search system. The batch search system 100 provides batch search interfaces (e.g., batch search query interface and batch search results interface) and supports operations for dynamically generating batch search queries, executing batch search queries, and causing display of batch search query result items. The client interface 160 may provide a media input (e.g., a media resource) as an input to a batch search interface engine 120. The batch search interface engine 120 along with the feature-tag operations engine 130 execute processing operations (e.g., feature detection, classification operations, batch search queries, other search system requests from the computing device 110).

The batch search interface engine 120 communicates client interface 160, item database 140 and the feature-tag operations engine 130. In concert with the a feature-tag operations engine 130, the batch search interface engine 120 may initiate queries to determine an attribute or item associated with the attribute based on the characteristics of the feature, detected by the batch search interface engine 120. In one embodiment, features and tags can be detected based classifiers using an item database taxonomy that identifies a plurality of categories (e.g., a category tree). The hierarchical framework (e.g., categories and subcategories) of the items database taxonomy are used for both feature recognition and tagging and corresponding hierarchy of the features to tags. It is contemplated that features of the media resource are associated with specific characteristics of the media resource (e.g., image or video).

The batch search interface engine 120 may support the operations for providing batch search queries, as described herein. The batch search interface engine 120 may perform a query on or instruct the item database 140 to query its memory to identify a plurality of matching or complementary items in response to the submission of a batch search query. Acting as a search engine, the batch search interface engine 120 may access a classification operation for organizing products in a product listing platform. The batch search interface engine 120 may be part of a product listing platform that supports access to the item database 140. The products in the product database may be stored based on a data structure having a structural arrangement of products (e.g., a product category and a product classification system). For example, the item database 140 may be implemented with a database schema that stores product listings based on product titles. The classification of the products may be maintained and annotated using classification operations that operate based on machine learning.

The batch search interface engine 120 manages the classification operations that are supported via the batch search system 100, as descried herein. Classification operations may be associated with determining an item or attribute by processing the detected feature through any suitable image searching engine or extracting attributes such as text via OCR or a barcode via a barcode scanner. The classifier may use the results of the image search query and/or the extracted attributes to query the feature-tag operation engine 130 in order to classify the detected feature as having one or more attributes. The image search engine may use a combination of text and images in a machine learning model that uses a convolution neural network (CNN) to extract information from an image. As such, different types of classification algorithms and corresponding classification operations are contemplated with embodiments of the present invention.

Figure 2A:
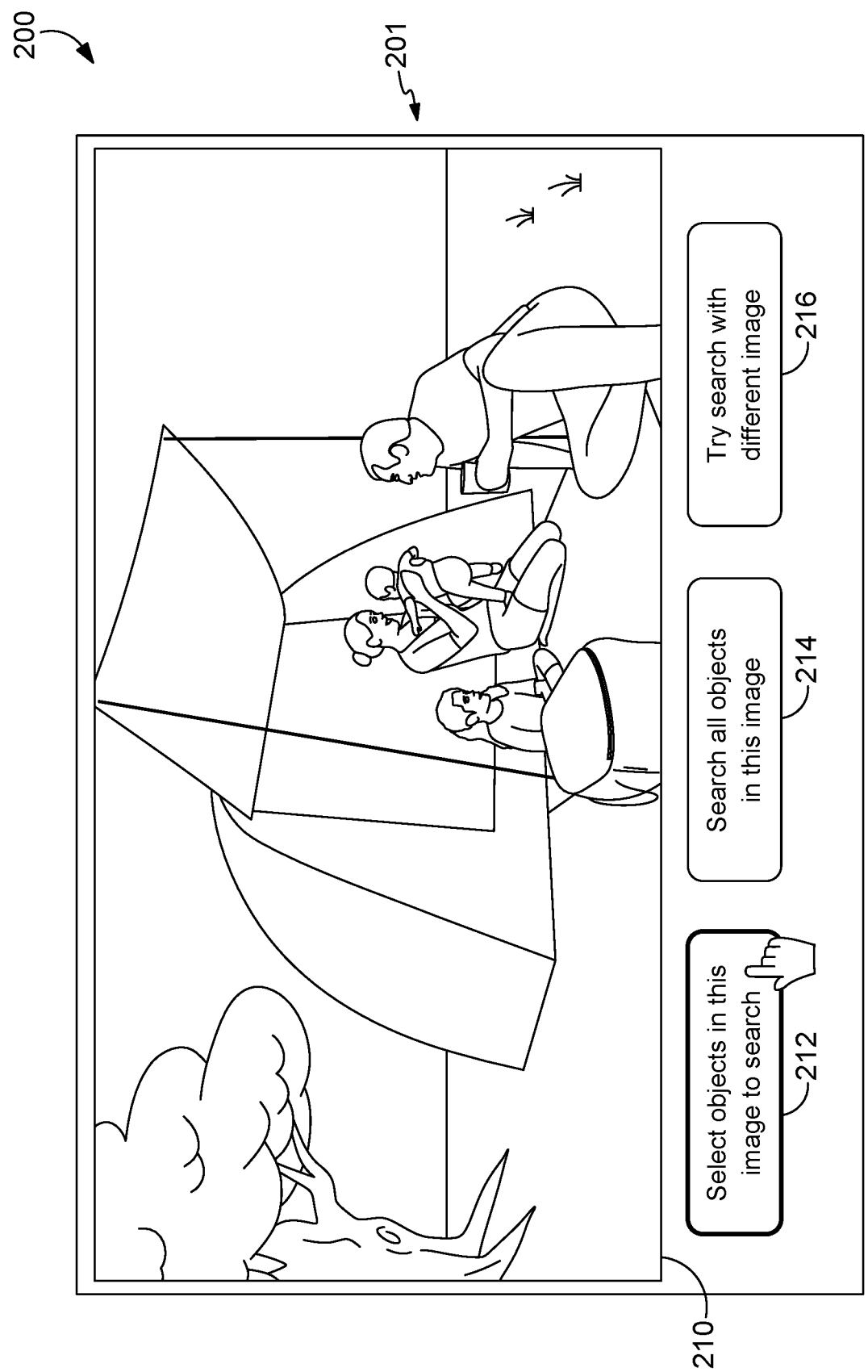
FIGS. 2A-2F are exemplary batch search system interfaces, in accordance with embodiments described herein.

With reference to FIG. 2A-2F, FIGS. 2A-2F illustrate exemplary view of a user interface for implementing a batch search interface engine 120 that supports batch searching. FIG. 2A illustrates an exemplary first view 201 of a user interface 200. The first view 201 illustrates how a media resource, such as an image, can be provided to the batch search system. The first view 201 comprises a representation of the media resource 210. In the case of an image, the image may be displayed as result of the user uploading the image from a user device, the retrieval of an image associated with the URL provided by the user, or a copy of an image captured by the user device. The first view 201 may comprise a plurality of input commands, such as a feature selection button 212 a search all features button 214 and retry input button 216. By interacting with the feature selection button 212 a user may manually specify particular features within the representation of the media resource 210. For example, a user may only desire to obtain search information on the tent and cooler depicted in the image. By activating the feature selection button 212, the user may manually specify that only these two features are to be detected and classified. By interacting with the search all features button 214, the user allows the batch search system to detect and classify all features it deems relevant from the representation of the media resource 210. For example, activating the search all features button 214 may result in the detection and classification of a tree, a tent, a cooler, a child, a baby, a woman, and a man. The retry input button 216 provides a means for replacing the representation of the media resource 210 with a different representation of a same or different media resource.

Figure 2B:
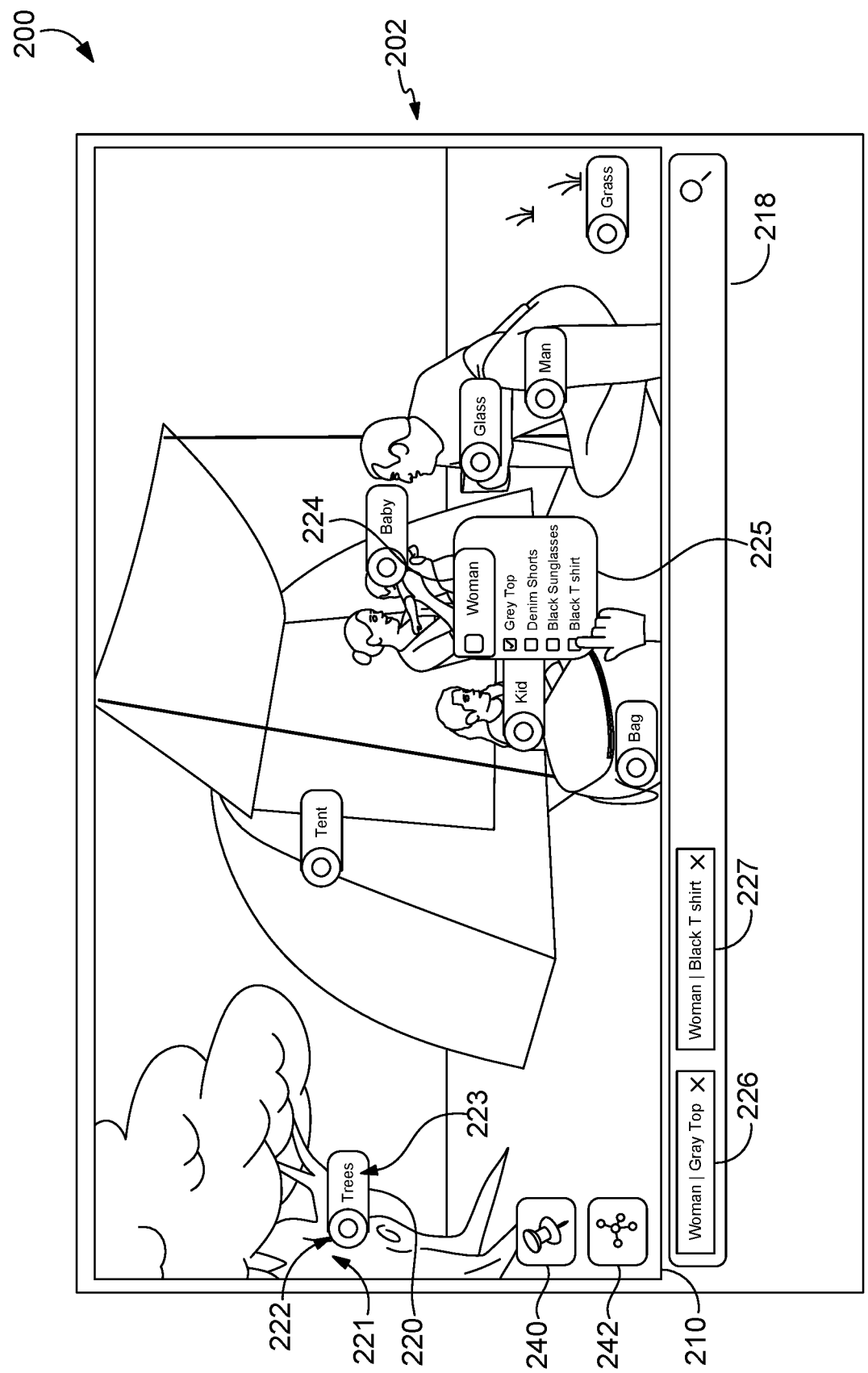

Referring to FIG. 2B, an exemplary second view 202 of the user interface 200 is provided. The illustration in FIG. 2B may be the result of activating the search all features button 214. In response to such an activation, the batch search system detects and classifies one or more features for example, the batch search system may detect a tree 221, and provide, as a result of the classifying, a first tag 220 that comprises an activation indicia 222 and a text tag label 223. For detected features that may have attributes detected or classified by the batch search system, an expanded selection pane 225 comprising one or more attribute tags may result from interaction with an expandable feature tag, such as the expandable feature tag 224. For example, the batch search system may detect a woman as a feature in the provided image. The batch search system may further detect or classify certain attributes of the woman in the image such as the clothing or accessories being worn by the woman. In this particular example, the batch search system has detected or classified the woman as wearing a gray top, denim shorts, black sunglasses, and a black T-shirt. As a result of the user selection of an attribute tag from the expanded selection pane 225, a correlated text search tag may be added to a search bar 218. For example, upon selection of the attribute tag "Gray Top" from the expanded selection pane 225, a first text search tag 226 is created for "Woman|Gray Top," and upon selection of the attribute tag "Black T shirt," from the expanded selection pane 225, a second text search tag 227 is created for "Woman|Black T shirt."

Also seen in the second view 202 of FIG. 2B, is a select feature button 240 and a combination search button 242. The select feature button 240 provides a functionality wherein, after the batch search system's initial detection and classification, the user may activate the select feature button 240 to manually specify a yet-undetected feature. The desired feature may not have been detected or classified because doing so would have created too much visual noise, or because the feature was too small or the boundaries less defined than other, more easily-detectable features, among other reasons. The combination search button 242 provides a user with the ability to associate multiple otherwise-independent tags together, in to a single text search tag. For example, if the combination search button 242 were activated prior to selecting "Gray Top" and "Black T shirt" from the expanded selection pane 225, instead of creating two separate text search tags, the batch search system may create a single, combination text search tag, such as "Woman|Gray Top|Black T shirt."

Figure 2C:
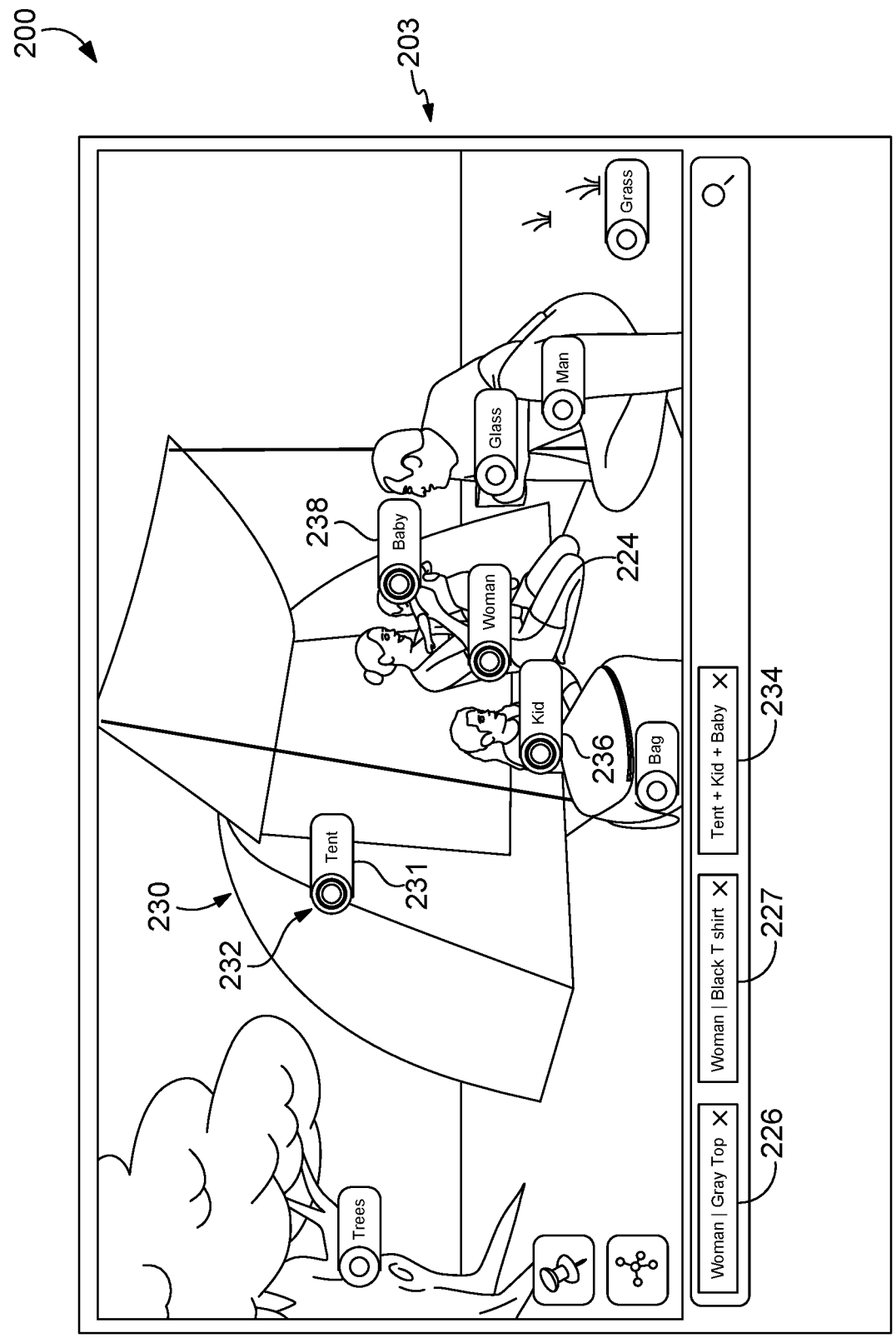

Turning now to FIG. 2C, an exemplary third view 203 of the user interface 200 is provided. The third view 203 illustrates the change to an indicia upon the selection of one or more tags from the representation of the media resource 210. For example, a tent 230 may have an associated tag 231 that comprises a text label and indicia 232. Compared to other indicia on unselected tags, the indicia 232 associated with the tent tag 231 indicates a changed state. In the example of FIG. 2C, the indicia 232 associated with the tent tag 231 has been modified to a changed state in response to its selection as part of a combination text search tag 234. Also seen in FIG. 2C, the batch search system has created combination search tag 234 in response to the activation of the combination search button 242 of FIG. 2B and subsequent selection of the "Tent" feature tag 231, the "Kid" feature tag 236, and "Baby" feature tags 238.

Figure 2D:
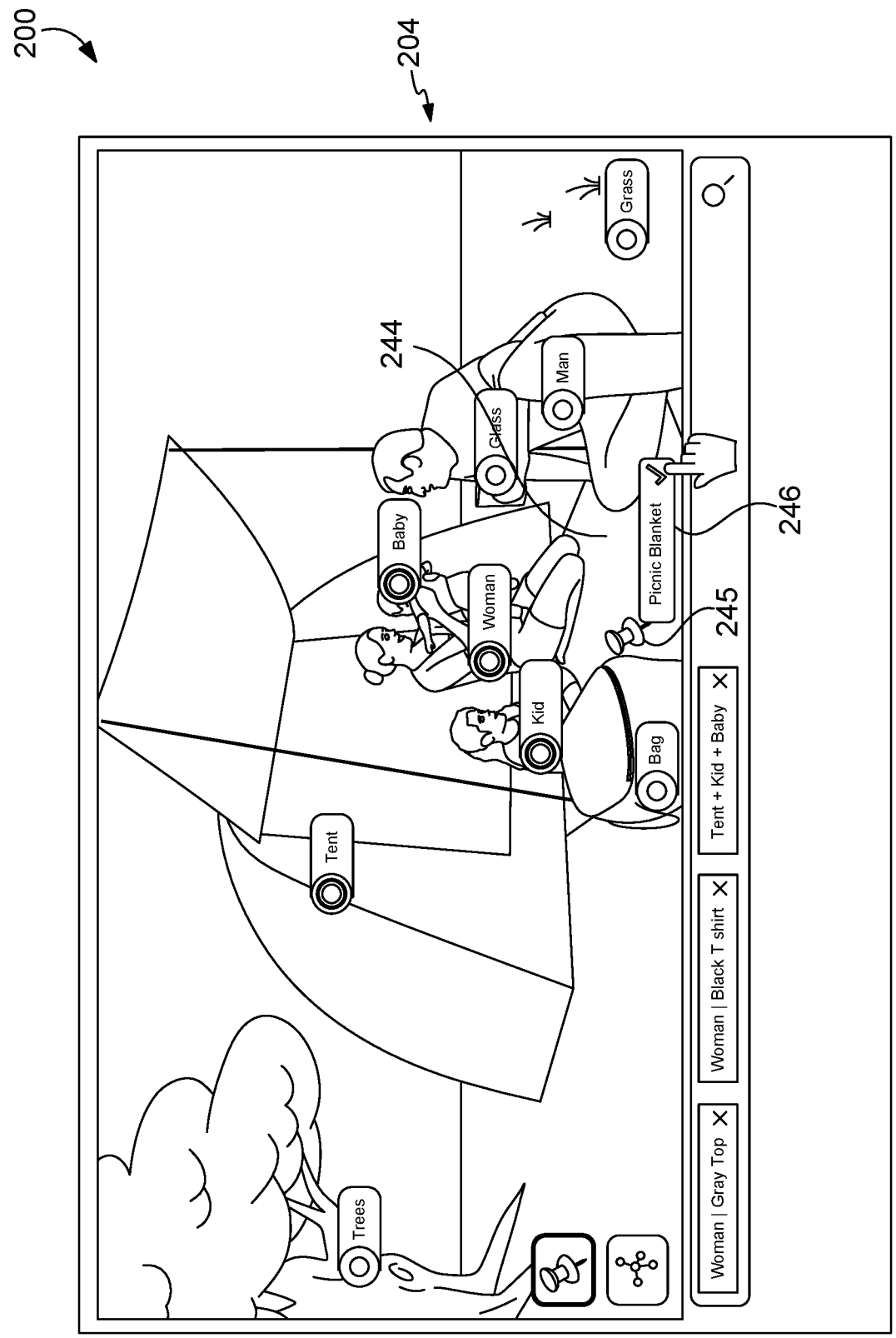

Referring to FIG. 2D, an exemplary fourth view 204 of the user interface 200 is provided. In addition to adding individual search query tags 226, 227 (best seen in FIG. 2B) and combination search tags 234 (best seen in FIG. 2C) to the search bar 218, the batch search system 100 may provide a user the ability to activate the select feature button 240 in order to manually detect and classify and feature, and subsequently select the tag to be added to the search bar. For example, FIG. 2D illustrates that a picnic blanket 244 was not originally detected or classified by the batch search system. In response to activating the select feature button 240 and indicating to the picnic blanket 244 at a point 245 on the feature, the batch search system may specifically detect that a feature exists at point 245 and use any of the classification methods described herein, in order to generate a feature tag. Accordingly, a feature tag 246 associated with the picnic blanket 244 is provided by the batch search system and selectable for creation as a search query tag. Though specific examples have been provided for how a search query tags are generated from a media resources, it is also contemplated that the batch search system may provide a variety of other input methods for creating search query tags. Specifically, the batch search system may permit a user to use voice to text (e.g., using a microphone native to the computing device of FIG. 4) and may accept typed search query tags (e.g., using a text input function native to said computing device) in addition to or as an alternative to creating search query tags from detected features of a media resource.

Figure 2E:
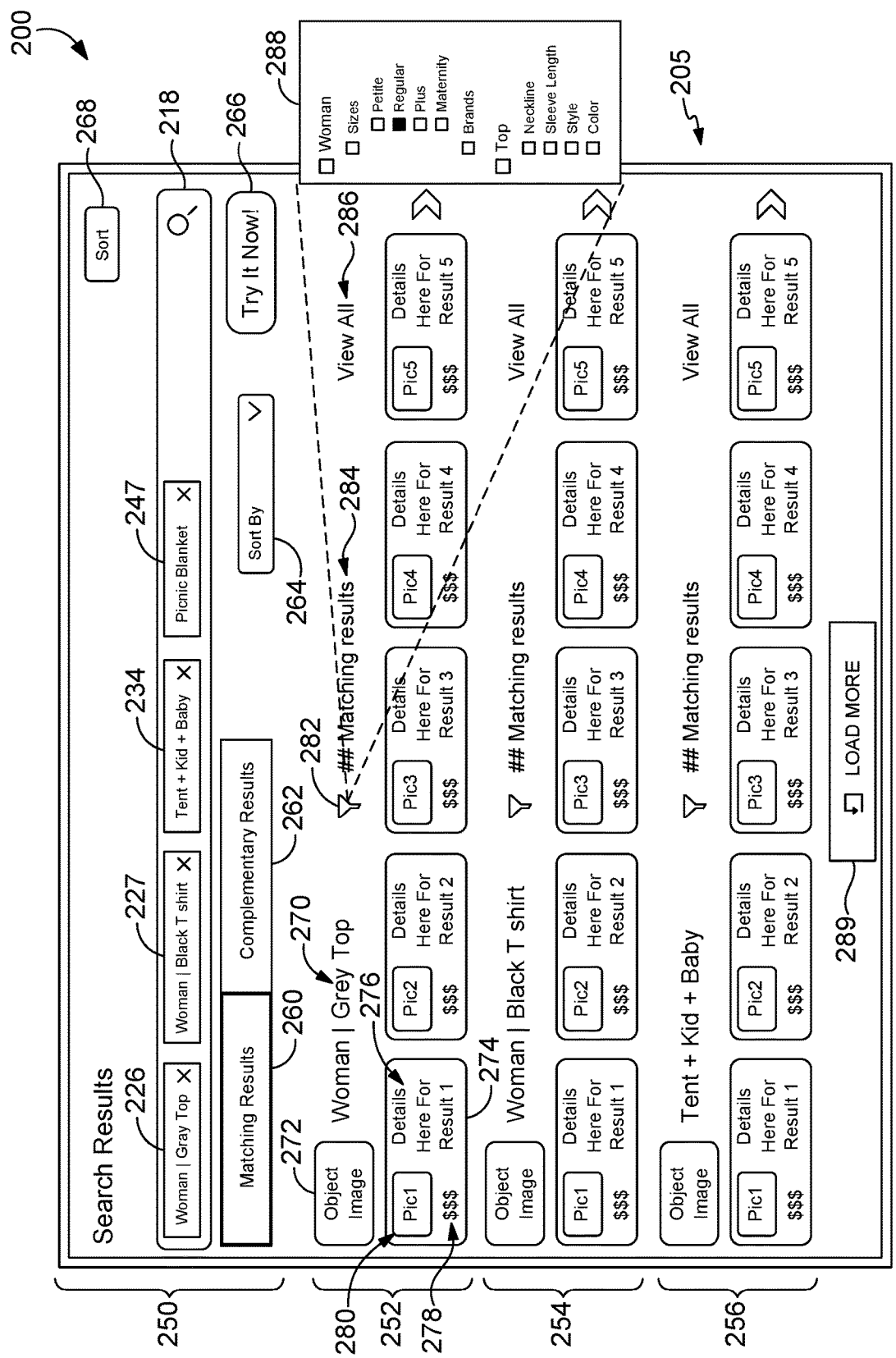

Turning now to FIG. 2E, an exemplary fifth view 205 of the user interface 200 is provided. The batch search system provides batch search query results having any one or more attributes as described in exemplary aspects herein. The fifth view 205 may comprise a search header and a plurality of search result groups, wherein each search result group is the results of a search query performed on a particular text search query tag, and various navigation features. The search header 250 may comprise the search bar 218 with a first text search query tag 226, a second text search query tag 227, a third text search query tag 234, and a fourth text search query tag 247, all of which were submitted, in a single search, to the batch search system. The search header may also comprise links to a matching results view 260 and a complementary results view 262. The search header may further comprise a sorting feature 264, which may sort the groups, or items within the groups, based on measurements such as relevance, best match (i.e., the most relevant search result items of a particular group, based on a search query algorithm, with respect to a corresponding search query tag), popularity, number of matching items, price, etc.

As mentioned, the fifth view 205 may comprise a plurality of search result groups, each group representing results for a particular text search query tag. For example, the fifth view 205 comprises a first search result group 252 containing results for the first text search query tag 226, a second search result group 254 containing results for the second text search query tag 227, and a third search result group 256 containing results for the third text search query tag 234. A fourth search result group containing results for the fourth text search query tag 247 may not be displayed on the default fifth view 205 because of display interface limitations (e.g., a small screen associated with a mobile device) but may be accessed with an additional results link 289.

Each search result group may contain various information that is determined to be relevant to a user's shopping decision. For example, each search result group may comprise a text label 270 that reminds the user of the text search query tag used to generate the groups' results. For batch search queries resulting from features detected in a media resource, the search result group may comprise a reproduction of the detected feature which was the basis for the creation of the feature tag. The search result group may comprise one or more matching item results. Each matching item result, such as a first matching item result 274 may comprise a text identifier 276 which may comprise an item name, keyword, or listing title associated with an item. The first matching item result 274 may also comprise a price for the item 278 and a preview image of the feature 280. In addition to the individual results, each search result group may comprise a filtering function 282, wherein matching item results within the group can be sorted in a sorting menu 288 by various attributes such as size, price, category, leaf category, availability, brand, color, style, or the like. The search result group may also comprise a result quantity indicator 284 that indicates the number of matching item results in the particular search result group and a "view all" feature 286 that changes the view from the fifth view 205 having a plurality of search result groups, to a view of results exclusive to the selected search result group.

Figure 2F:
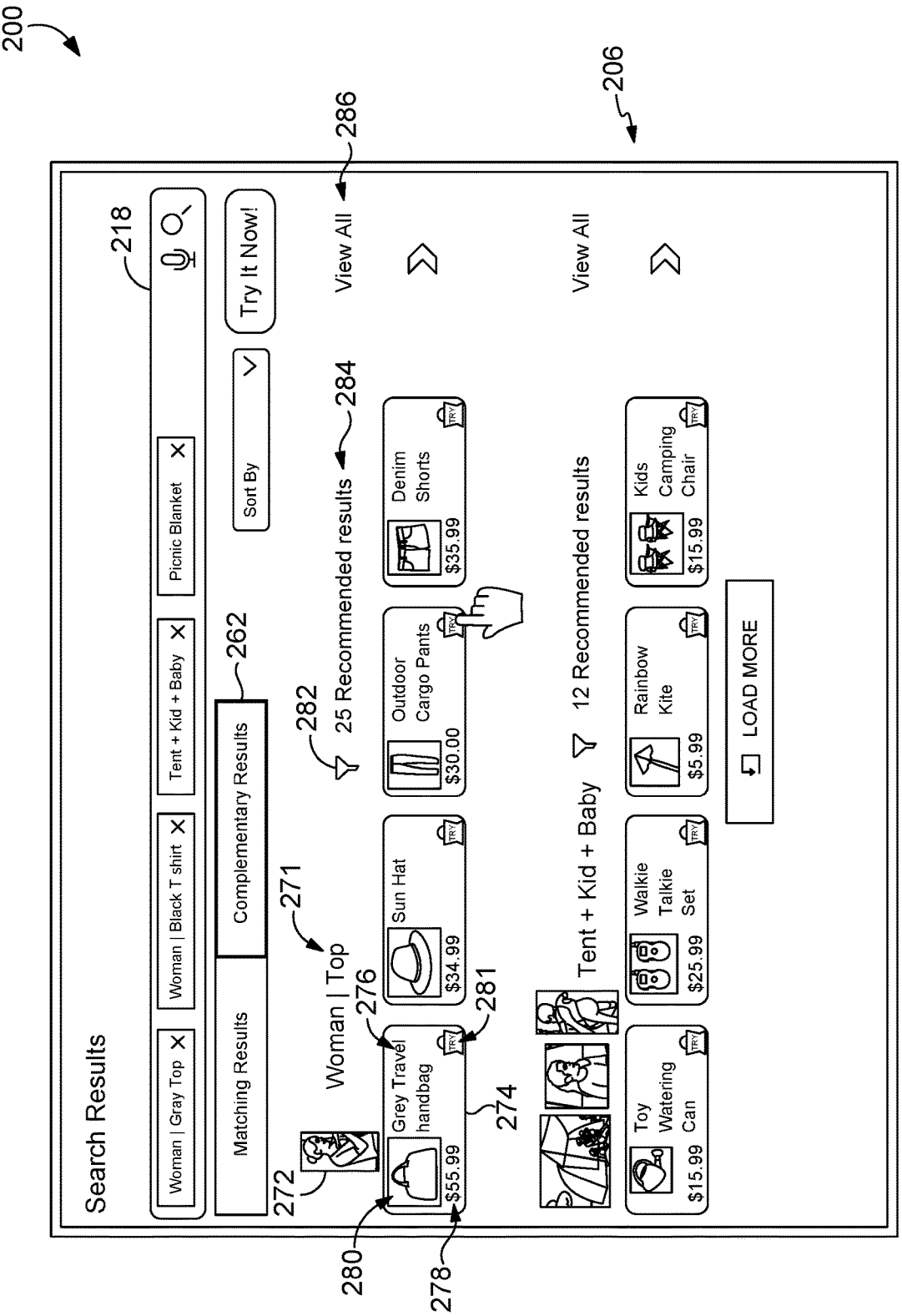

With reference to FIG. 2F, an exemplary sixth view 206 of the user interface 200 is provided. The sixth view 206 is an example of a listing of complementary results, accessed by selecting the complementary results link 262. Like the fifth view 205, the sixth view 206 comprises the search bar 218, indicating the text search query tags submitted in an earlier step. The sixth view 206 comprises a plurality of complementary search result groups. In aspects, a complementary search result group may be mapped one-to-one with a matching search result group. For example, the third search result group 256 of the fifth view 205 may be the result of a single text search query tag and may correlate directly to a single complementary search result. Thus, the "Tent+Kid+Baby" complementary results may be complementary only to the "Tent+Kid+Baby" matching search results. In other aspects, the complementary results may be a consolidation of multiple text search query tags. For example, though "Woman|Gray Top" and "Woman|Black T shirt" were separately searched, they may be consolidated in the complementary results view into a single group having a genus-species relationship to the groupings of the fifth view 205. That is, because gray tops and black t-shirts are both tops, and both were specific to women, the complementary result view may replace both species with the "Woman|Top" genus.

Each complementary search group may comprise a title 271 representing the feature, keyword(s), or attribute(s) searched. The complementary search group may also comprise a reproduction of the detected feature from the media resource, a filtering function 282, result quantity 284 and "view all" function 286. Each complementary search group may comprise one or more complementary item results 274, wherein each complementary item result is related to the title 271 and comprises a text indication 276 (e.g., title of listing, feature name, etc.), a price 278, a visual representation/preview 280 of the complementary item, and one or more selection toggles 281 that permits a user to add the item to a shopping cart.

Figure 3:
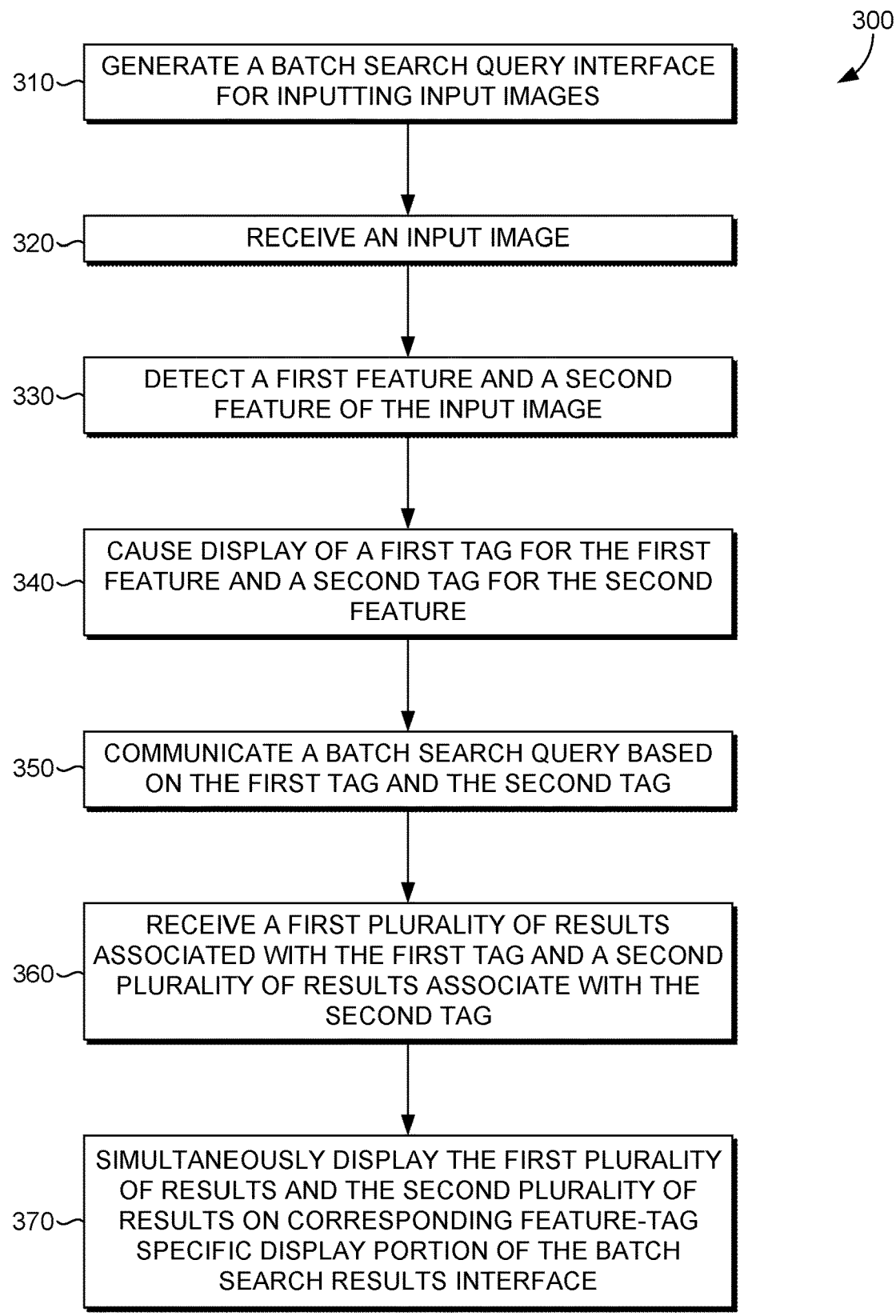
FIG. 3 is a flow diagram showing an example method for providing batch search interfaces, in accordance with embodiments described herein.
Figure 4:
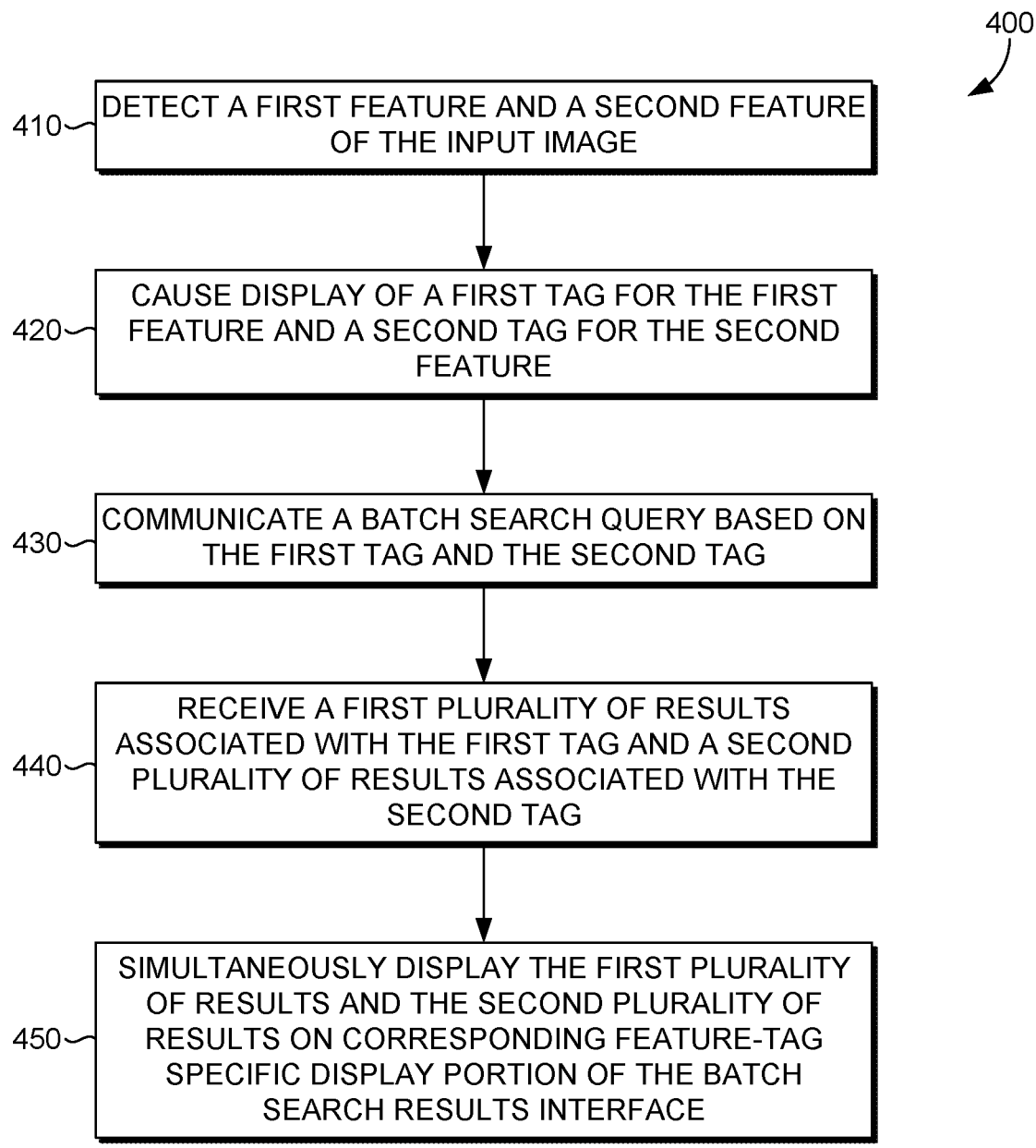
FIG. 4 is a flow diagram showing an example method for providing batch search interfaces, in accordance with embodiments described herein.
Figure 5:
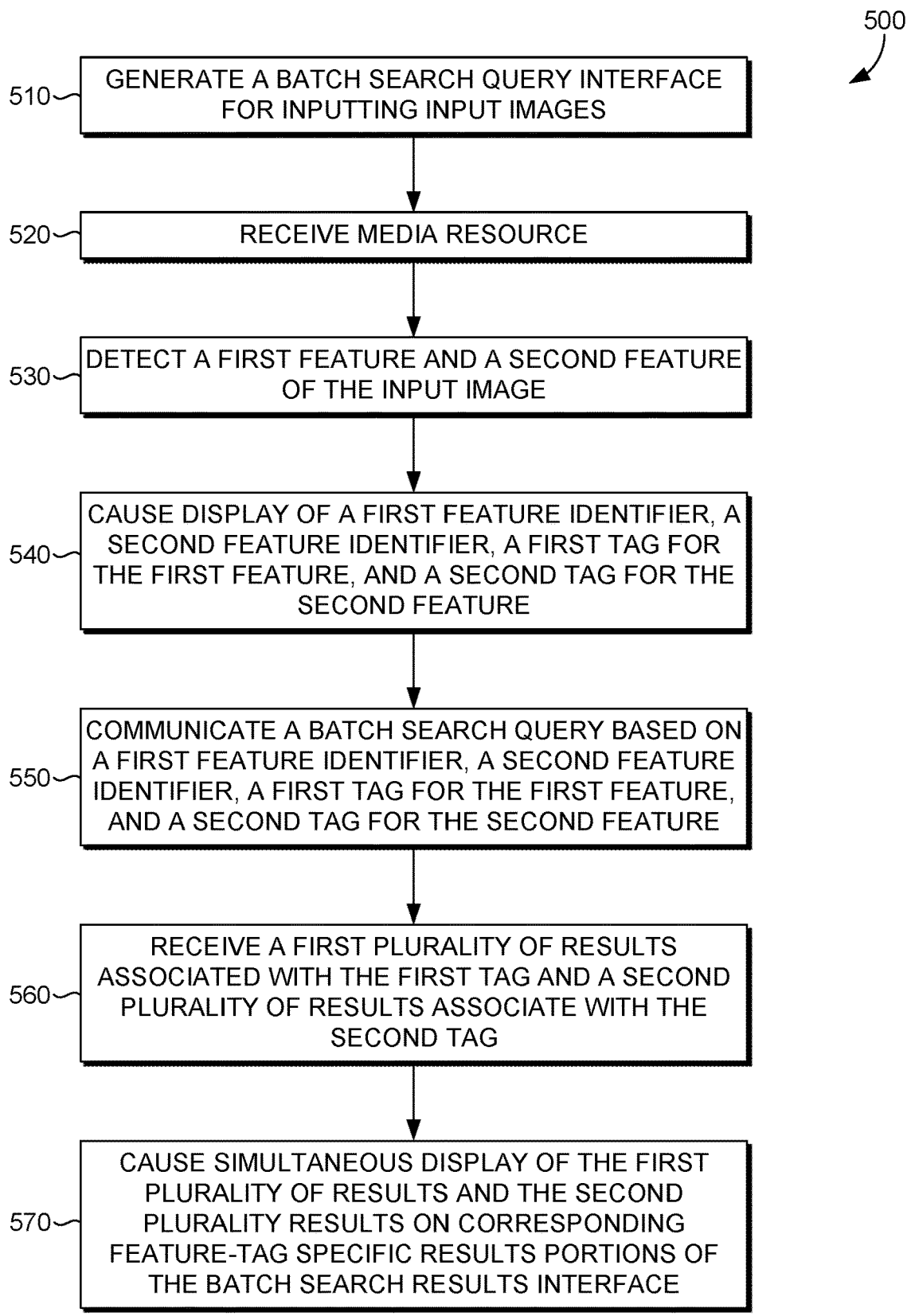
FIG. 5 is a flow diagram showing an example method for providing batch search interfaces, in accordance with embodiments described herein.

With reference to FIGS. 3, 4, and 5, flow diagrams are provided illustrating methods for proving batch search interfaces. The methods may be performed using the search system described herein. In embodiments, one or more computer storage media having computer-executable instructions embodied thereon that, when executed, by one or more processors can cause the one or more processors to perform the methods in the search system.

Turning to FIG. 3, a flow diagram is provided that illustrates a method 300 for providing batch search interfaces. Initially at block 310, a batch search query interface for inputting input images is generated. The batch search query interface includes a plurality of graphical control elements for dynamically generating batch search queries. At block 320, an input image is received. The input image is associated with a plurality of features. At block 330, a first feature and a second feature of the input image are detected as batch search query features. At block 340, a first tag for the first feature and a second tag for the second feature are caused to be displayed. Tags are attributes associated with features of the input image. At block 350, a batch search query, based on the first tag and the second tag, is communicated. At block 360, a first plurality of results associated with the first tag and a second plurality of results associated with the second tag are received. At block 370, the first plurality of results and the second plurality of results are caused to be displayed on corresponding feature-tag-specific results display portions of the batch search results interface.

Turning to FIG. 4, a flow diagram is provided that illustrates a method 400 for providing batch search interfaces. At block 410, a first feature and a second feature a media resource are detected as batch search query feature. At block 420, a first tag for the first feature and a second tag for the second feature are caused to be displayed. The batch search query interface includes a plurality of graphical control elements for executing batch search queries. At block 430, a batch search query based on the first tag and the second tag is communicated. The batch search query is dynamically defined via the batch search query interface based inputs for the plurality of graphical control elements that trigger dynamic alteration of graphical elements associated with features of the media resource or the batch search query that are displayed in the batch search query interface. At block 440, a first plurality of results associated with the first tag and a second plurality of results associated with the second tag are received. At block 450, the first plurality of results and the second plurality of results are caused to be displayed on corresponding feature-tag-specific results portions of the user interface.

Turning to FIG. 5, a flow diagram is provided that illustrates a method 500 for providing batch search interfaces. Initially at block 510, a batch search query interface for receiving media resources is generated. The batch search query interface includes a plurality of graphical control elements for executing batch search queries. At block 520, a media resource is received, the media resource is one of: an image or a video. At block 530, a first feature and a second feature of the input image are detected as batch search query feature. At block 540, a first feature identifier, a second feature identifier, a first tag for the first feature, and a second tag for the second feature are caused to be displayed. At block 550, a batch search query is communicated to cause generation of search result items for a single batch search query session. The batch search query is generated based on the first feature identifier, the second feature identifier, the first tag for the first feature, and the second tag for the second feature. At block 560, a first plurality of results associated with the first feature identifier and the first tag and a second plurality of results associated with the second identifier and the second tag are received for the single batch search query session. At block 570, the first plurality of results and the second plurality of results are caused to be displayed on feature-tag-specific results portions of the batch search results interface.

With reference to the batch search system 100, embodiments described herein support batch searching for a search system. The batch search system components refer to integrated components that implement the batch search system. The integrated components refer to the hardware architecture and software framework that support functionality using the batch search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the batch search system components may manage resources and provide services for the batch search system functionality. Any other variations and combinations thereof are contemplated with embodiments of the present invention.

By way of example, the batch search system may include an API library that includes specifications for routines, data structures, classes, and variables, which may support the interaction the hardware architecture of the device and the software framework of the batch search system. These APIs include configuration specifications for the batch search system such that the components therein may communicate with each other for the novel functionality described herein.

The batch search system 100 of FIG. 1 illustrates an example in which implementations of the present disclosure may be employed. In particular, FIG. 1 shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components, managers, engines, or generators as hardware, software, firmware, a special-purpose device, or any combination thereof. A system may be integrated into a single device or it may be distributed over multiple devices. The various components, managers, engines, or generators of a system may be co-located or distributed. For example, although discussed for clarity as a singular component, operations discussed may be performed in a distributed manner. The system may be formed from other systems and components thereof. It should be understood that this and other arrangements described herein are set forth only as examples.

Having identified various component of the batch search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be gray or fuzzy. Further, although some components of FIG. 1 are depicted as single components, the depictions are exemplary in nature and in number and are not to be construed as limiting for all implementations of the present disclosure. The batch search system 100 functionality may be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 6:
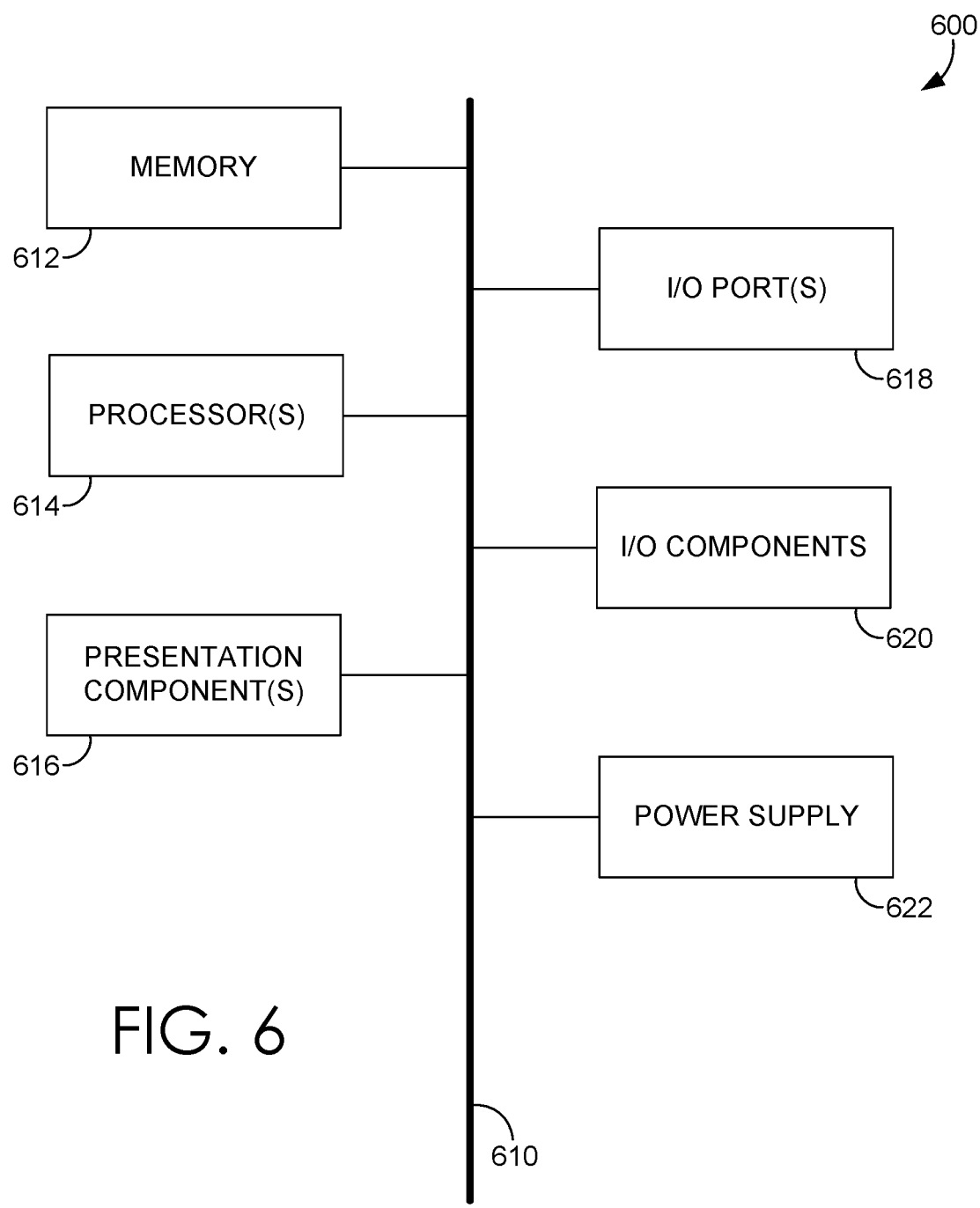
FIG. 6 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 616, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "mobile device, "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, camera, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the batch search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, cause the one or more processors to perform a method for providing batch search interfaces, the method comprising:
   generating a batch search query interface for receiving media resources, wherein the batch search query interface includes a plurality of graphical control elements for dynamically generating batch search queries;
   receiving a media resource from a user, wherein the media resource is one of an image or a video and comprises a representation of a plurality of objects;
   detecting a first object and a second object of the representation of the plurality of objects as batch search query features, the first object different than the second object;
   causing simultaneous display, on the batch search query interface, of a first tag for the first object and a second tag for the second object, wherein each of the first tag and the second tag comprise a text label and a selectable activation indicia;
   receiving, from the user, an indication that the selectable activation indicia has been selected for each of the first and second tag;
   communicating a batch search query based at least on the first tag and the second tag;
   receiving a first plurality of results associated with the first tag and a second plurality of results associated with the second tag; and
   causing simultaneously display, on a batch search results interface, of the first plurality of results and the second plurality of results on corresponding feature-tag-specific results display portions of the batch search results interface.

2. The one or more computer storage media of claim 1, wherein a feature of the plurality of features is a visual feature or non-visual feature of the input image, wherein the feature is represented as a tag in the batch search query interface such the tag is selectable to perform the batch search query.

3. The one or more computer storage media of claim 1, wherein detecting the first feature and the second feature of the input image is further based on an item database taxonomy that identifies a plurality of categories, wherein the first feature and the second feature are at a first level of a category tree of the item database taxonomy and the first tag and second tag are at a second level of the category tree.

4. The one or more computer storage media of claim 3, wherein detecting the first feature and the second feature of the input image is further based on a feature granularity setting associated with the input image, wherein the feature granularity setting is based on a hierarchical framework of the item database taxonomy.

5. The one or more computer storage media of claim 1, wherein detecting the first feature further comprises identifying the first feature as a damaged feature, wherein a tag for the first feature includes a damaged-feature tag as an indication that the first feature is damaged.

6. The one or more computer storage media of claim 1, wherein causing display, on the batch search query interface, of the first tag for the first feature and the second tag for the second feature, further comprises causing display of the plurality of graphical control elements for defining the batch search query using the plurality of graphical control elements.

7. The one or more computer storage media of claim 6, wherein user selections received using a plurality of graphical control elements trigger dynamic alteration of graphical elements associated with features of the input image or batch search query that are displayed in the batch search query interface.

8. The one or more computer storage media of claim 1, wherein the batch search results interface further comprises one or more of:
feature-tag-specific complementary results portions for displaying complementary results based on corresponding feature-tags; and
feature-tag-specific replacements display portions for displaying replacement results based on corresponding damaged feature-tags.

9. A method for providing batch search interfaces, the method comprising:
detecting a first object and a second object of a media resource, the first object different than the second object;
causing simultaneous display of, on a batch search query interface, a first tag for the first object and a second tag for the second object, wherein the batch search query interface includes a plurality of graphical control elements for executing batch search queries, and wherein each of the first tag and the second tag comprise a text label and a selectable activation indicia;
receiving, from the user, an indication that the selectable activation indicia has been selected for each of the first and second tag;
communicating a batch search query based on the first tag and the second tag, wherein the batch search query is dynamically defined via the batch search query interface based inputs for the plurality of graphical control elements trigger dynamic alteration of graphical elements associated with features of the media resource or the batch search query that are displayed in the batch search query interface;
receiving a first plurality of results associated with the first tag and a second plurality of results associated with the second tag; and
cause simultaneous display of, on a batch search results interface, the first plurality of results and the second plurality of results on corresponding feature-tag-specific results portions of the batch search results interface.

10. The method of claim 9, wherein detecting the first feature and the second feature of the media resource is a based on:
communicating at least a portion of the media resource to a batch search interface engine, wherein a batch search interface engine detects a plurality of features and a plurality of tags of the media resource based on an item database taxonomy that identifies a plurality of categories; and
receiving the plurality of features and the plurality of tags to dynamically cause display of at least a subset of the plurality of features and a subset of the plurality of tags.

11. The method of claim 10, wherein detecting the plurality of features and the plurality of tags is further based on a feature granularity setting associated with the media resource, wherein the feature granularity setting is based on a hierarchical framework of the item database taxonomy.

12. The method of claim 9, wherein triggering dynamic alteration of the batch search query further comprises dynamically changing on the batch search query interface each of a plurality of search queries associated with batch search query based on user selection associated with the plurality of graphical control elements.

13. The method of claim 9, wherein detecting the first feature further comprises identifying the first feature as a damaged feature, wherein a tag for the first feature includes a damaged-feature tag an indication that the first feature is damaged.

14. The method of claim 9, wherein the batch search results interface further comprises one or more of:
feature-tag-specific complementary results portions for displaying complementary results based on corresponding feature-tags; and
feature-tag-specific replacements display portions for displaying replacements results based on corresponding damaged feature-tags.

15. A system for providing batch search interfaces, the system comprising:
one or more processors; and
one or more computer storage media storing computer-useable instructions that, when used by the one or more processors, cause the one or more processors to execute:
a client batch search interface component configured to:
generate a batch search query interface for receiving media resources, wherein a batch search query interface includes a plurality of graphical control elements for executing batch search queries;
receive a media resource, wherein the media resource is one of: an image or a video;
initiate local operations, remote operations, or a combination thereof to cause detection of features of the media resource, wherein features of the media resource are associated with specific characteristics of the media resource, wherein image-type features are identified for images and video-type features are identified for video;
detect a first feature and a second feature of the media resource as batch search query features;
cause display, on the batch search query interface, a first feature identifier, a second feature identifier, a first tag for the first feature, and a second tag for the second feature, wherein tags are attributes associated with features of the media resource, wherein the batch search query interface includes a plurality of graphical control elements for executing batch search queries;
communicate a batch search query based on the first feature identifier, the second feature identifier, the first tag for the first feature, and the second tag for the second feature to cause generation of search result items for a single batch search query session, wherein the batch search query is dynamically defined via the batch search query interface based inputs for the plurality of graphical control elements trigger dynamic alteration of graphical elements associated with features of the media resource or the batch search query that are displayed in the batch search query interface;
receive a first plurality of results associated with the first feature tag identifier and the first tag and a second plurality of results associated with the second feature tag identifier and the second tag for the single batch search query session; and
cause simultaneous display, on a batch search results interface, of the first plurality of results and the second plurality of results on feature-tag-specific results portions of the batch search results interface.

16. The system of claim 15, wherein the client batch search interface component is further configured to: initiate local operations, remote operations, or a combination thereof to cause detection of features of the media resource, wherein features of the media resource are associated with specific characteristics of the media resource, wherein image-type features are identified for images and video-type features are identified for video.

17. The system of claim 15, further comprising a batch search interface engine configured to:
   detect a plurality of features and a plurality of tags of the media resource based on an item database taxonomy that identifies a plurality of categories; and
   communicate the plurality of features and the plurality of tags to cause dynamic display of at least a subset of the plurality of features and a subset of the plurality of tags.

18. The system of claim 15, further comprising a batch search interface engine configured to:
   dynamically define the batch search query via the batch search query interface based inputs for a plurality of graphical control elements trigger dynamic alteration of graphical elements associated with features of the media resource or the batch search query that are displayed in the batch search query interface.

19. The system of claim 15, further comprising a batch search interface engine configured to:
   detect that the first feature as a damaged feature, wherein a tag for the first feature includes a damaged-feature tag as an indication that the first feature is damaged.

20. The system of claim 15, further comprising a batch search query interface engine configured to:
   identify complementary results corresponding to a feature-tag-specific complementary results portion for displaying complementary results based on corresponding feature-tags; and
   identify replacement results corresponding to a feature-tag-specific replacements display portions for displaying replacement results based on corresponding damaged feature-tags.

\* \* \* \* \*